I. & G. LEHMANN.
MANUFACTURE OF GLASS BUTTONS.

No. 171,394.  Patented Dec. 21, 1875.

Witnesses
John Becker
Fred. Haynes

Isaac Lehmann
Goudchaux Lehmann
by their Attorneys
Brown & Allen

UNITED STATES PATENT OFFICE.

ISAAC LEHMANN AND GOUDCHAUX LEHMANN, OF NEW YORK, N. Y.

IMPROVEMENT IN THE MANUFACTURE OF GLASS BUTTONS.

Specification forming part of Letters Patent No. 171,394, dated December 21, 1875; application filed December 7, 1875.

*To all whom it may concern:*

Be it known that we, ISAAC LEHMANN and GOUDCHAUX LEHMANN, both of the city, county, and State of New York, have jointly invented a new and useful Improvement in the Manufacture of Glass Buttons; and we do hereby declare that the following is a full, clear, and exact description of the same, reference being had to the accompanying drawing, which forms part of this specification.

Glass buttons which are made in dies or molds have heretofore been very imperfectly constructed, by reason of the difficulty which has been experienced in proportioning the amount of the plastic glass introduced within the one mold to insure the close fit of the other mold or die within the first one, and in default of which a ragged or protruding edge has been formed around the button, that it has been necessary afterward to grind off, in order to give a proper finish to the button. This after-work has involved much labor and expense, and even then the button has not been as perfect in its finish as is desirable.

This invention consists in an improvement in manufacturing glass buttons, whereby they are formed with a band or collar produced by a special construction of the molds or dies, and which serves to take up any surplus glass that may be placed in the one mold irrespective of the depth of entry of the other mold, so far as a perfect finish of the button is concerned, and so that there is no sharp ragged edge to be afterward ground off or dressed, thus greatly economizing, as well as beautifying the construction of the button.

Figure 1:
Figure 3:
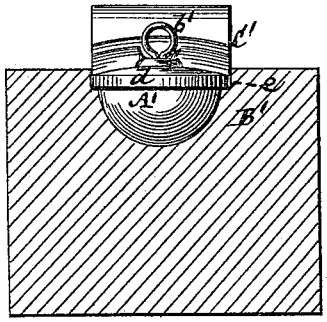
Figure 2:
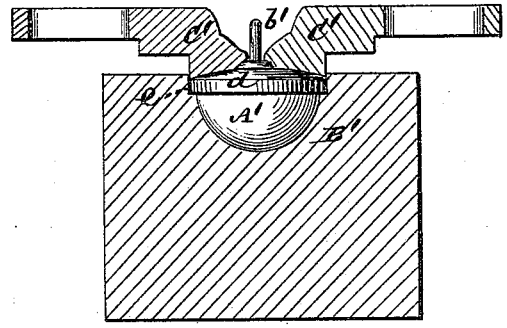
Figure 4:
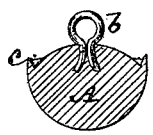

Figure 1 represents a side view of a glass button constructed in accordance with our invention; and Figs. 2, 3, sectional elevations, in planes at right angles to each other, of a pair of dies or molds, as in the act of forming the improved button. Fig. 4 is a sectional view of a glass button as produced under the old method, before grinding off the ragged edge left by the dies; and Fig. 5, a vertical section of the dies as in the act of forming such a button.

Figure 5:
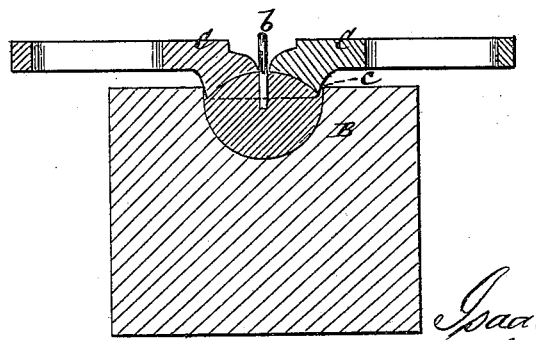

To explain our invention, reference will first be made to Figs. 4 and 5 of the drawing.

A is a glass button, as heretofore produced by means of dies B and C C, the lower one, B, of which is the receiving die or mold for the lump of plastic glass, and the upper divided die or mold C C the follower or pressing die, through which the metal shank *b* is inserted, and which divided upper die is tapered off on its face edges to readily enter within the lower die, and by a suitable application of pressure to form the button as required.

This construction of the dies invariably leaves a sharp, ragged, and protruding edge, *c*, around the button, nor is it practicable to so proportion the amount of plastic glass introduced within the lower die as that the face edges of the upper die will meet the interior of the lower die to prevent the formation of such edge; but room must be left for surplus glass around the face edges of the upper die, so that when the upper die is pressed into the lower die a ragged edge, *c*, is formed, which has afterward to be removed by grinding.

This defect we obviate by our manufacture of the button. Thus, referring to Figs. 1, 2, and 3 of the drawing, A' is the improved button, formed with a band or collar, *d*, around it, and having the usual metal shank *b'*. To form said button the lower die B' has an annular enlargement, *e*, made in and around its mouth end or face. This annular enlargement forms a cylindrical chamber to receive snugly within it the face end of the divided or pressing die C' C'—that is, said upper die partially enters in a close-fitting manner within, irrespective of the depth of its entry, such cylindrical chamber or annular enlargement, when force is applied to the die, the extent of entry being dependent upon the amount of plastic glass in the lower die, so that the annular enlargement *e* always forms a receiving-space for the surplus glass, and the button, as it comes from the mold, is left with a perfect band or collar, $d$, which requires no grinding-off, but gives a finish and improved appearance to the button.

We claim—

As an improvement in the manufacture of glass buttons, the formation of the button with a band or collar, $d$, produced by constructing the die in which the plastic glass is placed with a cylindrical receiving space or enlargement, $e$, in its mouth, for the surplus glass under pressure, substantially as shown and described.

ISAAC LEHMANN.
GOUDCHAUX LEHMANN.

Witnesses:
BENJAMIN W. HOFFMAN.
FRED. HAYNES.